S. Rogers,
Hay Fork.
No. 2260. Reissued. May. 29. 1866.
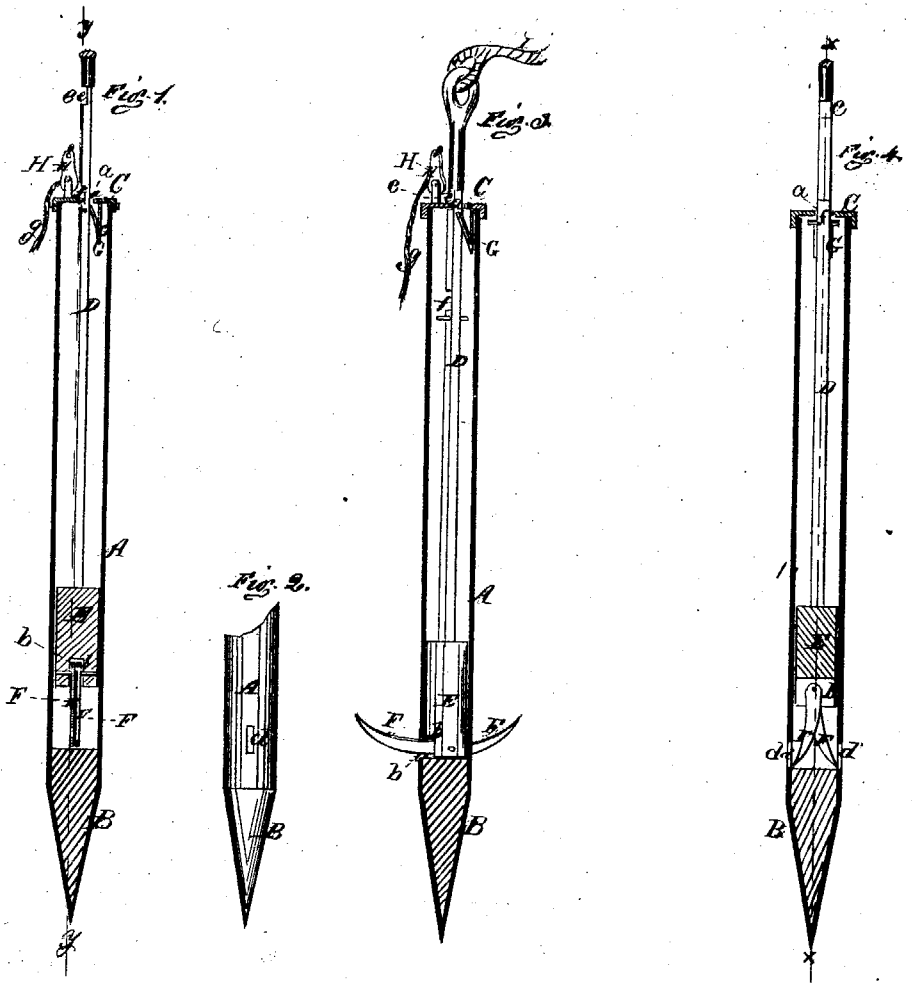
Witnesses:
Benj. Morris
C. L. Topliff
Inventor:
Seymour Rogers.
per Munn & Co
attys

UNITED STATES PATENT OFFICE.

SEYMOUR ROGERS, OF PITTSBURG, PENNSYLVANIA.

IMPROVEMENT IN HORSE HAY-FORKS.

Specification forming part of Letters Patent No. 46,027, dated January 24, 1865; Reissue No. 2,260, dated May 29, 1866.

*To all whom it may concern:*

Be it known that I, SEYMOUR ROGERS, of the city of Pittsburg, in the county of Allegheny and State of Pennsylvania, have invented a new and useful Improvement in Hay-Elevators; and I do hereby declare that the following is a full, clear, and exact description thereof, which will enable others skilled in the art to make and use the same, reference being had to the accompanying drawings, forming part of this specification, in which—

Figure 1 is a vertical section through the center of my improved hay-elevator. Fig. 2 is an exterior view of the lower part of the penetrator. Fig. 3 is a representation of my improved hay-elevator with the barbs set and the case or penetrator in section. Fig. 4 is a vertical central section through the line *y y* of Fig. 1, the plane of section being at right angles to that given in Fig. 1.

In each of the figures similar letters of reference indicate like parts.

My invention relates to a new and improved device for lifting hay and depositing it in barns, and for the formation of hay-stacks, the implement with its load being raised by horse-power.

The object of my invention is to provide a device for raising hay simpler in construction and more convenient for use than any heretofore known or used.

In the drawings, A represents the penetrator, being a metallic case, which may be of cylindrical form. It is pointed at the lower end, B, and the upper end is furnished with a cap, C, in which is a square hole, *a*, to allow the rod D to pass through it.

The rod D, by which the apparatus with its load is lifted, has a loop or ring, *c*, at its upper end, to which the hoisting-rope I is attached, and at its lower end, inside of the penetrator-case A, is a head or enlargement, E, in the bottom of which is a slot, *b*, wherein two arms or barbs, F F, which are slightly curved and pointed at the end, are pivoted at *x*, the arms being allowed to work freely on their pivot in the slot *b*. When the rod D is pressed downward in the case or penetrator A the barbs F F are forced outward through the holes *d d*, as shown in Fig. 3, and are retained in this position by the rod D, which is notched at *e*, the notch *e* being pressed over the edge of the hole *a* in the cap C by means of the spring G, as shown in Fig. 3.

When it is desired to withdraw the barbs F F into the case A, it is done by raising up the rod D in the case or penetrator, the barbs being retained in that position by means of a notch, *f*, in the rod D, below the notch *e*, which is pressed over the edge of the hole *a* in the cap by the spring G, as shown in Fig. 1.

On top of the cap C is placed an eccentric or cam, H, on the same side of the rod D as that in which the notches *e* and *f* are made. By turning the cam H down, by means of the cord *g* attached to it, the cam presses the rod D to one side against the spring G, so as to releave the notch *e* or *f*, as the case may be, from the cap C, and thus leave the rod D free to slide up or down in the case A, so as to draw in or protrude the barbs F F.

The operation of my hay-elevator is as follows: The barbs F F being drawn into the penetrator-case A, as in Fig. 4, and held in that position by the notch *f* on the rod, the penetrator is shoved down a suitable distance into the hay point foremost. The cam H being then turned, by pulling the cord *g* so as to release the notch *f*, the rod D is depressed in the case A, which causes the barbs F F to protrude through the holes *d d* in the case, and the notch *e*, coming opposite the edge of the hole *a* in the cap, is pressed over it by the spring G, thus securing the rod D in its position, with the barbs protruding from the case.

The elevator is then raised by means of the hoisting-rope attached to the rod D, the barbs F F retaining the load of hay until it is conveyed to the desired spot, when the operator, by pulling the cord *g*, so as to turn the cam H and throw the notch *e* free from the hole *a* in the cap, releases the rod D and allows it to rise in the case A, which it does by reason of the weight of the hay on the barbs F F, which are thus drawn back into the case A, the hay dropping down, and the rod D being again locked by the notch *f* catching over the edge of the hole *a*, so that the elevator is ready to repeat the operation.

What I claim as my invention, and desire to secure by Letters Patent, is—

1. In hay-elevators which combine a penetrator and rod with a barb or barbs, attaching such barb or barbs to the rod or lever by which they are operated, substantially as hereinbefore described.

2. So constructing the hay-elevator, substantially as hereinbefore described, as that the rod or lever to which the movable barb or barbs are attached, or are set and discharged, shall serve as the handle by which the elevator is suspended and supported.

3. The notches *e* and *f* in the rod D, in combination with the cap C and cam H, substantially as and for the purposes hereinbefore set forth.

In witness whereof I, the said SEYMOUR ROGERS, have hereunto set my hand this 21st day of March, A. D. 1866.

SEYMOUR ROGERS.

In presence of—
S. ROGERS,
JOHN A. STRAND.